United States Patent Office 2,943,509
Patented July 5, 1960

2,943,509

GEARING SYSTEM FOR GEAR WHEELS GENERATED OF CYLINDRICAL BLANKS

Imre Botka, Budapest, Hungary, assignor to Ganz Vagon és Gépgyár, Budapest, Hungary Filed June 1, 1955, Ser. No. 512,542

2 Claims. (Cl. 74—462)

This invention relates to pairs of involute gears generated of cylindrical blanks.

It is known that two such involute gears when assembled to a pair of gears may be mated within certain limits at any intermediate values of the center distance of the assembly without impairing the kinematic conditions of the correct rolling-off capacity of the meshing teeth. This means that with given values $z_1$ and $z_2 > z_1$ for the number of teeth or with given values $i = z_2/z_1 \geq 1$ for the gear ratio the tooth dimensions may, according to the aforesaid feature, be selected so as to comply with the requirement of rolling-off without backlash. As known from the historic development of gearing science, various systems of involute gearing have been suggested each of which differs from the other ones in that which is the portion of the involute above the base circle, i.e. above the circle of radius $r_a$ generating the involute of the tooth flank that had been selected, by means of the so-called "profile displacement," as the working profile of the teeth.

The invention aims at introducing an advantageous new profile displacement into the gearing practice, this is done, however, in a mediate manner by ascertaining, on the basis of recent scientific investigations, the most suitable value of a geometrically explicable quantity characteristic of the invention which is easily perceptible on the assembled pair of gears whilst the representation of the profile displacement necessitates reference to the generating tool as well. This quantity, the so-called "partition coefficient" defined hereinafter, is interrelated with the profile displacements of the individual gears in such a manner that its knowledge renders the said profile displacements and other important quantities of a pair of involute gears unequivocally determinable by means of known gearing geometrical relations.

Figure 1:
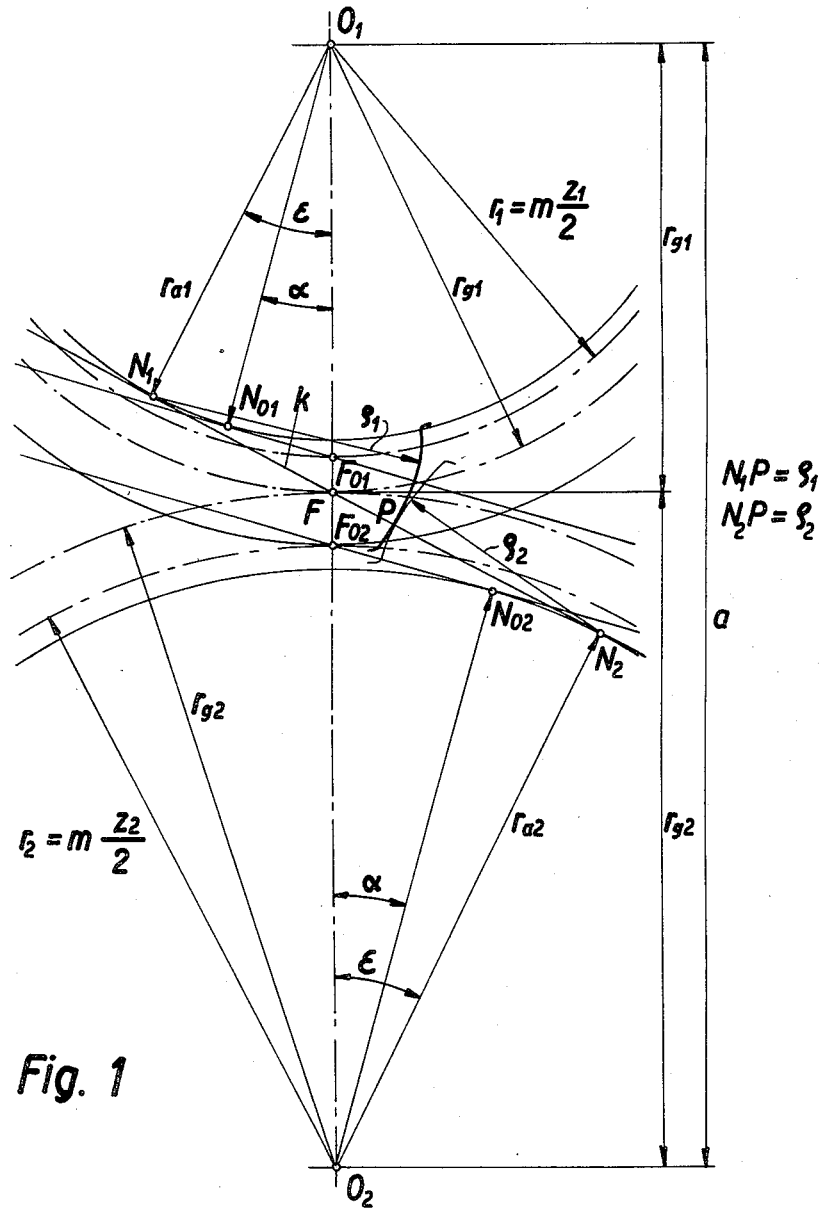
Figure 2:
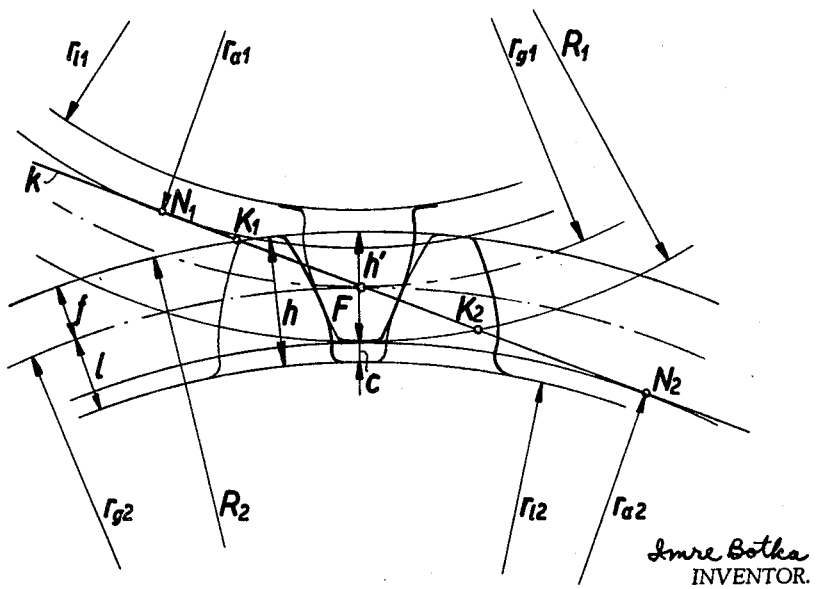
Figure 3:
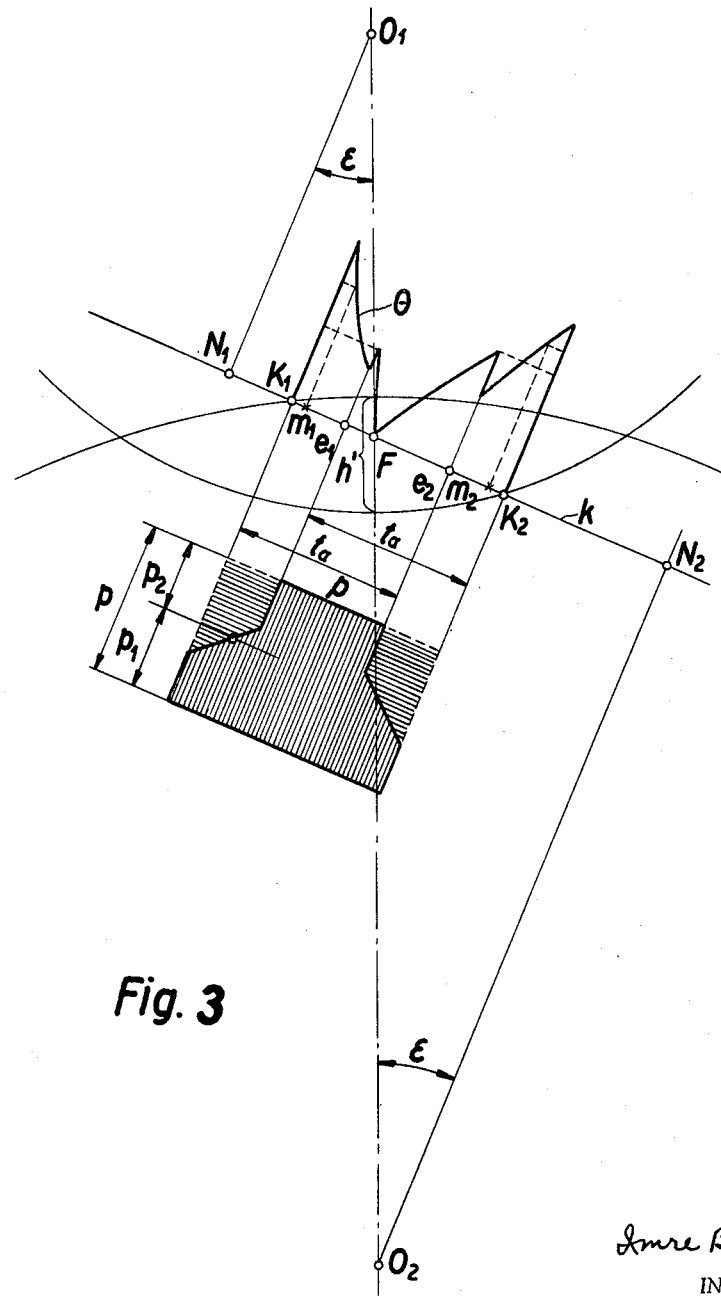

Terms facilitating the understanding of the invention in this sense will be recorded by taking reference to the accompanying figures of which:

Fig. 1 shows the engagement of two gears assembled to a pair of gears according to "general gearing" so as to have profile displacements, Fig. 2 is a partial side elevational view of meshing teeth according to Fig. 1, Finally, Fig. 3 is a diagram, in accordance with Fig. 1, of the momentary local temperature increases $\theta$ characterizing, as explained below, the behaviour of mating involute gears from the point of view of the invention, whereon reference letters are, as usual in the pertinent art, provided with indices 1 or 2, according to whether they refer to the pinion or the gear, respectively, of an explanatory pair of gears.

Fig. 1 shows the pinion and gear by their characteristic circles only, the tooth engagement being represented thereon by adjacent tooth profiles of the pinion and gear, contacting each other in the momentary point of contact P. Assuming that the tooth module $m$, the tooth numbers $z_1$ and $z_2 = i z_1$, radii $r_{a1}$ and $r_{a2}$ of the base circles, radii $$r_1 = \frac{m z_1}{2} \text{ and } r_2 = \frac{m z_2}{2}$$

of the generating pitch circles, radii $r_{g1}$ and $r_{g2}$ of the pitch circles, the center distance $\overline{O_1 O_2} = a = r_{g1} + r_{g2}$, furthermore, the tool pressure angle $\alpha$ and the pressure angle $\epsilon$ of mating gears are, as a rule, arbitrarily selectable or given known magnitudes, they are interrelated, as may be concluded partly from Fig. 1 also, by the following known relations having significance for the invention:

$$r_{g1} = \frac{a}{i+1}, \qquad r_{g2} = \frac{ai}{i+1},$$

$$r_{a1} = r_{g1} \cdot \cos \epsilon = r_1 \cos \alpha = \frac{m z_1}{2} \cdot \cos \alpha$$

$$r_{a2} = r_{g2} \cdot \cos \epsilon = r_2 \cos \alpha = \frac{m z_2}{2} \cdot \cos \alpha$$

$$a = m \cdot \frac{z_1 + z_2}{2} \cdot \frac{\cos \alpha}{\cos \epsilon}$$

This latter equation shows that in case of $\epsilon = \alpha$ (elementary gearing) $r_{g1}$ and $r_{g2}$ are reduced to $r_1$ and $r_2$, respectively, and that with increasing $\epsilon$ the center distance $\overline{O_1 O_2} = a$ increases as well, its increasement over the "elementary" center distance $a_0 = r_1 + r_2$ being due to the profile displacements $m x_1$ and $m x_2$ (not shown on the drawing) according to that for $\epsilon > \alpha$ the generating pitch circles are shifted apart from the pitch point F constituting the point of tangency of the pitch circles. This point is obtained also as the point of intersection of the center distance $\overline{O_1 O_2}$ on the common inner tangent $k = \overline{N_1 N_2}$ of the base circles called the action or contact line along which the contact between two meshing teeth, e.g. in the varying point P of tangency, occurs when their flanks roll off upon each other. It is noteworthy from the point of view of the invention that $\overline{N_1 P} = \zeta_1$ and $\overline{N_2 P}$ are the radii of curvature, belonging to the momentary point of tangency P, of the contacting tooth profiles, their sum $$\zeta_1 + \zeta_2 = \overline{N_1 N_2} = a \cdot \sin \epsilon \qquad (1)$$

being in all possible positions of P of constant value.

Fig. 2 is, as regards further radii of importance, completed with radii $R_1$, $R_2$ of the outer circles as well as with radii $r_{d1}$, $r_{d2}$ of the foot circles. As shown on this figure, the "whole depth" $h$ of a tooth is composed of its addendum $f$ and of its dedendum $d$ situated on the outer and inner side, respectively, of the pitch circle, the dedendum of one of the mating gears making up the sum of the tooth clearance $c$ and the addendum of the other gear, so that e.g. for $h_2 = h_1 = h$ $$h_2 = f_2 + d_2 = f_1 + f_2 + c$$

The sum of the addenda $h' = f_1 + f_2$ figuring in this formula i.e. the distance cut out on the center distance between the outer circles is called the "working depth" the magnitude of which may be calculated, on the basis of known gearing geometrical considerations, from the fundamental data (module, tooth numbers, angles $\alpha$ and $\epsilon$, etc.) of a given gearing task so that $h'$ can be taken therewith for a further given date. However, its decomposition to $f_1$ and $f_2$ remains undetermined unless one may resort to some special auxiliary assumption concerning mostly the goodness of the gears to be constructed and delivering the wanting condition in dependence of which, fortuitously, even a tolerably satisfactory solution of the decomposition problem can be obtained. Here it is preferable to ascertain, instead of the absolute magnitude of $f_1$ or $f_2$, the relative measure of either of them, e.g. of $f_2$, related in the form of the fraction $$q_2 = \frac{f_2}{h'}$$

called the "partition coefficient" in the introductory sense, to the whole of the working depth $h'$, by means of which, or more correctly, of the expressions $$f_2 = q_2 h', \quad f_1 = h' - f_2 = (1 - q_2) \cdot h'$$

the outer radii $R_1$ and $R_2$ of the pinion and gear, respectively, may be given, according to the formulas resulting from Fig. 2

$$R_1 = r_{g1} + f_1 = \frac{a}{i+1} + (1 - q_2) \cdot h' \quad (2)$$

$$R_2 = r_{g2} + f_2 = \frac{ai}{i+1} + q_2 h' \quad (3)$$

as linear functions of $q_2$.

With $q_2$ and with the dimensions derived therefrom in the above manner the respective gearing system is determined in its whole seeing that the pinion and gear of a corresponding pair of gears can be mated but in a single manner at unequivocally definite profile displacements so that there is still the only question to be discussed: how to find a reasonable assumption for ascertaining $c_2$.

As to such assumptions, gearing investigators availed themselves mainly of conceptions concerning wear caused by tooth friction, e.g. of the so-called slide-roll ratio (Büchner) or of the total of the friction losses arising between the first and last points of contact $K_1$ and $K_2$, respectively, of the contact line $\overline{N_1 N_2}$ (Maag). However, conceptions of this kind proved objectionable and, according to present judgment, of wholly arbitrary nature leading just in the cases of Büchner and Maag to contradictory conclusions thereby making the conjecture justified that efforts to perfect gears above up to date level require, in addition to the consideration of ordinary tooth friction, also that of other competent factors.

Such factors are, apart from the wear caused by sliding, the pitting and scoring of the working surfaces which engender deterioration and lesion of the teeth as well. The pitting, i.e. the result of minute surface portions being torn out from the working surfaces in consequence of superficial adhesion and elastic material fatigue under the action of great line loading, is due to unfavourable values of the operative Hertzian pressure. The tendency to scoring is determined, on the one hand, likewise by the values of the Hertzian pressure and, on the other hand, mainly by the momentary temperature increases at the contacting places the influence of which seems, according to the latest results of scientific investigations, to be decisive as regards the quality of the gearing. This problem has been first dealt with on quite general basis by the Dutch scientist Blok who, however, failed to apply the results of his investigations to establish a new system of gearing. The momentary local temperature increase, the "temperature flash" as called by Blok, has been computed by him by regarding various physical characteristics of the material, mainly the local heat conduction that is to say, the heat conductivity and the specific heat determining the former, respectively. Experimental control proved temperature values obtained by means of such calculation to be practically correct.

In the case of gear wheels the temperature value delivered by the formula of Blok represents properly the maximum of the local momentary surplus temperature (temperature increase) occurring within the zone of contact above the average operative temperature of the wheel. Having transformed the original expression of Blok so as to render it more simple and reduced the characteristics of material quality to a single figure this formula may, in case of steel-on-steel combination, be written in the form $$\theta_{\max} = 1.85 \mu \cdot (\sqrt{v_{t1}} - \sqrt{v_{t2}}) \cdot \sqrt[4]{p^3 \cdot \frac{\zeta_1 + \zeta_2}{\zeta_1 \zeta_2}}$$

wherein $\mu$ means the friction coefficient between the teeth, $p$ the tooth load falling to unit length of the face width (specific pressure or line load) at the inspected place of contact in kilogram per centimeters, $v_{t1}$ and $v_{t2}$ the speed components, directed normally to the line of action, of the contacting tooth generatrices of the pinion and of the gear, respectively, in centimeter per secundum, finally $\zeta_1$ and $\zeta_2$ the radii of curvature of the contacting tooth profiles at the place of contact in centimeters.

Since the aforesaid values of $\zeta_1$, $\zeta_2$, $v_{t1}$ and $v_{t2}$ may be given as functions of an independent variable measured on the action line $k$ as axis of abscissae from a suitable origo (they may be given e.g. in the function of $\zeta_1$ with $N_1$ for origo or in the function of $\zeta_2$ with $N_2$ for origo, respectively), and because the line load $p$ may also be expressed in the function of the aforesaid independent variable in final result the variation of $\theta_{\max}$ may be diagrammed along the action line as well. Such a variation of $\theta_{\max}$ diagrammed above the contact or action line is shown on Fig. 3, the typical variation of the line load being illustrated here below the action line. The points $e_1$ and $e_2$ limiting the range of the so-called single tooth contact are obtained by measuring the base pitch $t_a = t \cdot \cos \alpha = m\pi \cdot \cos \alpha$ from the first and last points of contact $K_2$ and $K_1$, respectively.

It may be seen from Fig. 3 that at the points $e_1$ and $e_2$ the curve $\theta_{\max}$ has, in consequence of the abrupt variation of the line load, indeed top values; however, in the extreme points $K_1$ and $K_2$ of contact there are top values which, according to this illustration, apart from the case of high line loads, surpass the former. Since at places of higher top values also the tendency to scoring is correspondingly greater, it is, according to the invention, desirable to compensate the top values belonging to the said points of contact $K_1$ and $K_2$ or $e_1$ and $e_2$, this being feasible by means of a suitable profile displacement or a suitable value of $q_2$. However, in dependence on use, material quality and operative conditions of gear wheels compensations based upon other points of view might be considered as well. Thus, e.g. in case of high angular speeds $\omega_1$ and $\omega_2$ constituting factors of the speed components $v_{t1} = \zeta_1 \omega_1 = \zeta_1 i \omega_2$ and $v_{t2} = \zeta_2 \omega_2$, respectively, it is favourable to apply a compensation whereby the mean value of the temperature increases $\theta_{\max}$ in the first section of double tooth contact ($K_1 \ldots e_1$) is made equal to the analogous mean value in the last section of double tooth contact ($e_2 \ldots K_2$).

As is shown in Fig. 3, in the sections of double tooth contact there may, at any rate, be fixed points $m_1$ and $m_2$ on the one and other side, respectively, of the pitch point F in which points $\theta_{\max}$ in fact assumes such mean values belonging to the respective sections of contact. With regard to such points $K_1$—$K_2$, $e_1$—$e_2$ or $m_1$—$m_2$ the main object of the present invention may be fixed in establishing a gearing system wherein the actually highest top values of the local momentary temperature increase occurring in two points of contact are compensated such points of contact distinguished by the said highest top values being determined by special requirements which may be raised against the pair of gears to be constructed.

By compensating the top values of the Blok increases of temperature in such a manner the advantage may be afforded that the gear assembly cannot be subjected to momentary and local temperature increases greater than the said top values deemed still admissible both most dangerous top values are levelled and thus the tendency to tooth lesions caused by them is most suitably limited.

In order to make the Blok results practically applicable to gearing technics the inventor had to contrive the way in which a characteristic base value of the gearing, in the most suitable manner the afore defined partition coefficient $q_2$ may be determined so as to be in conformity with these results, according to which the scope of the invention will be understood so that it be extended to pairs of involute gears rendered capable of being mated at values of $q_2$ satisfying the condition, formulated below, of the said conformity.

Starting for this purpose from the above-quoted original expression of Blok the basic condition of compensating the Blok increases of temperature $/\theta' = \theta''/$ in two suitably selected points P', P'' (e.g. $K_1$, $K_2$ or $e_1$, $e_2$) of the action line may be given, with regard to the constancy of the sum $\zeta_1 + \zeta_2$ according to Formula 1 in the form $$(\sqrt{v_{t_1}'} - \sqrt{v_{t_2}'}) \cdot \sqrt[4]{\zeta_1'' \zeta_2''} = (\sqrt{v_{t_1}''} - \sqrt{v_{t_2}''}) \cdot \sqrt[4]{\zeta_1' \zeta_2'}$$

wherein the identical and equal factors (1.85 and $\sqrt[4]{p^3}$, furthermore, $\zeta_1' + \zeta_2' = \zeta_1'' + \zeta_2''$)

are omitted on both sides of the equation. This equation turns, after having substituted therein the former expressions $v_{t1} = \zeta_1 \omega_2$ and $v_{t2} = \zeta_2 \omega_2$ applied to the points P' and P'', into $$(\sqrt{i^2 \zeta_1'} - \sqrt{\zeta_2'}) \cdot \sqrt[4]{\zeta_1'' \zeta_2''} = (\sqrt{i^2 \zeta_1''} - \sqrt{\zeta_2''}) \cdot \sqrt[4]{\zeta_1' \zeta_2'}$$

wherein the common factor $\sqrt{\omega_2}$ of the $v_t$ terms is omitted as well. Further simple mathematical transformations of this equation lead to its rational form $$\zeta_2' \zeta_2'' = i^2 \cdot \zeta_1' \zeta_1''$$

in which, by means of Formula 1, $\zeta_1'$ and $\zeta_2''$ may be expressed with $\zeta_2'$ and $\zeta_1''$, respectively, so that the final equation of the basic condition $\theta' = \theta''$ reads $$(i^2 - 1) \cdot \zeta_1'' \zeta_2' = a \sin \epsilon \cdot (i^2 \zeta_1'' - \zeta_2')^4$$

Taking now $K_1$ and $K_2$ for P' and P'', respectively, $\zeta_2'$ and $\zeta_1''$ are here, as may be concluded from Fig. 1 or 2, known gearing-geometrical functions of $R_1$ and $R_2$, respectively, running $$\zeta_2' = \sqrt{R_2^2 - r_{a2}^2}$$

and $$\zeta_1'' = \sqrt{R_1^2 - r_{a1}^2}$$

or with the Formulas 2 and 3

$$\zeta_2' = \sqrt{\left(\frac{ai}{i+1} + q_2 h'\right)^2 - \left(\frac{mz_2}{2} \cdot \cos \alpha\right)^2}$$

and $$\zeta_1'' = \sqrt{\left[\frac{a}{i+1} + (1 - q_2) h'\right]^2 - \left(\frac{mz_1}{2} \cdot \cos \alpha\right)^2}$$

Thus, for this special selection of P', P'' the significance of the compensation $\theta' = \theta''$ is in fact appearing in $q_2$, for the computation of which the last equation delivers an algebraic equation of eight degrees with regard to $q_2$. Such an equation being, in the form of a finite expression, in general irresolvable, its solutions may be found, in the case of numerically given determinative values, by means of known approximative calculations, and may, for the purpose of systematic tables, also be tabulated.

The course of the calculation is in principle of the same nature also in case the compensation of the temperature increases has to be accomplished according to the already mentioned conditions $\theta_{e1} = \theta_{e2}$ or $\theta_{m1} = \theta_{m2}$ since the curvature radii of the tooth profiles rolling off in the respective points of contact upon each other may be given, though in a somewhat more intricate manner, again by means of $R_1$ and $R_2$, constituting likewise gearing-geometrical functions of $q_2$ the derivation of which belongs to the sphere of general knowledge of gearing experts.

In the foregoing the description of the invention was, as to its contents, apparently limited to spur gears. However, the invention may be applied to helical gears also, considering that the radii of curvatures figuring in Formula 4 represent then radii belonging to the "normal section" of a helical tooth of helix angle $\beta$. From the fact that between these radii and the radii of curvature belonging to the "front section" of the helical gear there exists a proportionality of constant ratio depending on $\beta$ it follows that actual computations of $q_2$ may be performed in principle in the above explained manner.

The question whether a finished pair of gears belongs to the sphere of the invention may be decided by means of known span measurements of which the actual partition coefficient can be exactly calculated. Therefore, $q_2$ is in fact a magnitude that characterizes the invention in a wholly satisfactory manner, this being understood also in the sense referred to above that other magnitudes characteristic of the invention, first of all the profile displacements $mx_1$ and $mx_2$, may be obtained therefrom by means of known gearing geometrical equations. As to these latter magnitudes it is, however, noteworthy to point out that profile displacements determined in this manner are, as may be concluded from Formula 4 containing the pressure angle $\epsilon$ of mating gears, not limited to some narrow path of the practically useful values of this angle as in case of other known gearing systems. In fact, the invention affords the essential advantage of selecting $\epsilon$ in a wholly unlimited and conscious manner according to further profitable points of view hereby demonstrating also that in view of profile displacements obtainable in this manner its scope remains new and discernible from that of any other known system. However, in accordance with the results of control calculations, the scope of the invention explained in this sense is still to be understood so that for a selected value of $\epsilon$ a tolerance not exceeding $\pm 3\%$ of the theoretical value of $q_2$ seems irrelevant from the point of view of the perfectness of the gearing and thus is held admissible.

The span measurement of the helical gear can, of course, be gauged but in the normal direction coinciding with the longitudinal direction of the rack-form tool, however, by means of the gauge shown in Fig. 6 also. The actual span measurement may be obtained from the formula $$M = M_h \cdot \cos \beta_a$$

wherein $M_h$ is the span measurement of the spur gear corresponding to the front section figure of the helical gear; the correctness of this formula rests upon the consideration that M is the orthogonal projection of $M_h$ in a plane of tangency of the base cylinder where the particular helix angle has been designated $\beta_a$. Expressing $M_h$ in terms of the front section figure and deriving $\cos \beta_a$ from the latter formula of $\tan \beta_a$ the equation of M runs.

$$M = \left\{ \left[ (2n - 1) \cdot \frac{\pi}{2} + z \cdot \text{inv } \alpha_h \right] \cdot \cos \alpha_h + 2x \cos \beta \sin \alpha_h \right\} \cdot \frac{m_h}{\sqrt{1 + \tan^2 \beta \cos^2 \alpha_h}} \quad (8)$$

wherein there are the above expressions of $x_1$ and $x_2$, respectively, given for the normal section which should be taken for $x$ according to whether a pinion or a gear is to be computed.

As regards the calculation of the factor $q_2$ figuring in the equations of the helical gearing it is remarkable that the calculation, based upon the compensation of the Blok increases of temperature $\theta' = \theta''$ arising in two points P' and P'' of the contact path, may be effected in the same manner as it was done in the case of spur gearing, i.e. by means of the radii of curvature of the front section figure. This possibility is justified by the fact that the actual radii of curvature belonging to the normal section are, because of the mentioned projective relationship of both sections, always identically proportional to the corresponding radii of curvature of the front section, in consequence whereof such factors of proportionality fall away on both sides of the equation $\theta' = \theta''$. However, a table elaborated for spur gearing is, apart from special cases or without certain restrictions, not applicable to helical gearing seeing that at least the outside radii $R_1$ and $R_2$ contained in the equations of $\zeta_1''$, $\zeta_2'$ depend, as may be seen from the equations of their terms $a$ and $h'$, on the helix angle $\beta$ and on the front pressure angle $\alpha_h$. Such a restriction may consist e.g. in selecting $\beta \leq 10°$, as it has proved true by comparing calculations that in such cases values of $x_1$ and $x_2$ obtained with the equations derived for spur and helical gearing do not differ by more than ±5%. On the other hand, a tolerance limit of the same magnitude has proved for $x_1$ and $x_2$, as to the perfectness of the gearing, practically in general admissible, wherefore the invention is considered to be extended, with reference to the theoretically exact value of the profile displacement, so as to cover profile displacements within this not anticipated range of tolerance as well.

Sample pages, referred to above, of a spur-gearing table show, by way of example, the manner or arrangement of both the starting (arbitrary) and resulting data of gear calculation. Among them, the engagement factor $\kappa$, and relative width $v_{f1}'$ of top land of the pinion, and the maximum stress factor $\xi_k$ mean auxiliary values, disregarded above, of the preliminary design and could also be omitted.

Apart from other facts, the evidence of the superiority of gear wheels geared according to the invention is furnished also by that such gear wheels have, whilst completely satisfying the expectations raised against them as to their resistibility to wear and exemption from getting scored, proved durable even above the measure of these expectations.

I claim:

1. A pair of involute gear wheels the pinion (1) and wheel (2) of which are mated so as to have tooth addenda of magnitudes $f_1 = (1-q_2).h'$ and $f_2 = q_2 h'$, respectively, depending on the partition coefficient $q_2$ to be determined, inclusive a tolerance not exceeding ±3%, from the condition $$(i^2-1).\zeta_1''\zeta_2' = a.\sin \epsilon.(i^2\zeta_1'' - \zeta_2')$$

wherein $h' = f_1 + f_2$ means the working depth of the mating teeth, $i$ the gear ratio, $a$ the center distance, $\epsilon$ the pressure angle of mating gears, whilst $\zeta_1''$ and $\zeta_2'$ denote, for two points of contact P' and P'' distinguished on the contact line by the actually highest top values of the momentary local temperature increases (the so-called Blok increases of temperature) arising between contacting teeth, the radii of curvature of the individually corresponding pinion and gear tooth profiles, these radii of curvature being given by gearing-geometrically derivable expressions of the outer radii $$R_1 = \frac{a}{i+1} + (1-q_2)h'$$

and $$R_2 = \frac{ai}{i+1} + q_2 h', \text{ respectively}$$

2. A pair of involute gear wheels the pinion (1) and wheel (2) of which are mated so as to have tooth addenda of magnitudes $f_1 = (1-q_2).h'$ and $f_2 = q_2 h'$, respectively, depending on the partition coefficient $q_2$ to be determined, inclusive a tolerance not exceeding ±3%, from the condition $$(i^2-1)\zeta_1''\zeta_2' = a.\sin \epsilon.(i^2\zeta_1'' - \zeta_2')$$

wherein $h' = f_1 + f_2$ means the working depth of the mating teeth, $i$ the gear ratio, $a$ the center distance, $\epsilon$ the pressure angle of mating gears, whilst $\zeta_1''$ and $\zeta_2'$ denote in the first and last points of contact of the contact line, the radii of curvature of the individually corresponding pinion and gear tooth profiles, these radii of curvature being given by the expressions $$\zeta_1'' = \sqrt{\left[\frac{a}{i+1} + (1-q_2)h'\right]^2 - r_{a1}^2}$$

and $$\zeta_2' = \sqrt{\left(\frac{ai}{i+1} + q_2 h'\right)^2 - r_{a2}^2}$$

respectively, $r_{a1}$ and $r_{a2}$ signifying herein the radii of the base circles of the mating gears.

References Cited in the file of this patent

UNITED STATES PATENTS

| | | |
|---|---|---|
| 1,828,114 | Hubbard | Oct. 20, 1931 |
| 1,997,228 | Nichols | Apr. 9, 1935 |
| 2,306,854 | Zimmer | Dec. 29, 1942 |
| 2,463,725 | Stonebraker | Mar. 8, 1949 |